United States Patent
Lee

(10) Patent No.: US 8,398,279 B2
(45) Date of Patent: Mar. 19, 2013

(54) HEADLAMP APPARATUS FOR VEHICLE

(75) Inventor: Hyun Soo Lee, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 13/346,276

(22) Filed: Jan. 9, 2012

(65) Prior Publication Data

US 2012/0300485 A1    Nov. 29, 2012

(30) Foreign Application Priority Data

May 25, 2011    (KR) .................. 10-2011-0049765

(51) Int. Cl.
*B60Q 1/04*    (2006.01)
(52) U.S. Cl. ........ 362/465; 362/466; 362/467; 362/514; 362/539; 362/547; 362/373
(58) Field of Classification Search .......... 362/465–468, 362/507, 512, 516–518, 538, 539, 547, 277, 362/282, 284, 294, 297, 298, 303, 305, 322, 362/324, 351
See application file for complete search history.

(56) References Cited

U.S. PATENT DOCUMENTS

| 7,901,121 | B2* | 3/2011 | Ohshio et al. | 362/512 |
| 8,070,339 | B2* | 12/2011 | Koike | 362/538 |
| 8,235,570 | B2* | 8/2012 | Okubo et al. | 362/539 |
| 8,287,165 | B2* | 10/2012 | Iwasaki | 362/517 |
| 2001/0040810 | A1* | 11/2001 | Kusagaya | 362/351 |
| 2010/0165654 | A1* | 7/2010 | Okubo et al. | 362/539 |
| 2011/0305029 | A1* | 12/2011 | Chuang et al. | 362/464 |

* cited by examiner

*Primary Examiner* — Thomas Sember
(74) *Attorney, Agent, or Firm* — Saliwanchik, Lloyd & Eisenschenk

(57) ABSTRACT

The present disclosure relates to a headlamp apparatus for vehicles. The headlamp apparatus includes a light emitting diode (LED) light source located at a first focal point and emitting light, a reflecting member surrounding the LED light source and reflecting light emitted from the LED light source, a lens unit disposed in front of the LED light source and allowing light to pass therethrough, a cooler disposed under the LED light source to cool the LED light source and having a leading end located behind a second focal point, a shielding part rotatably disposed at the second focal point between the LED light source and the lens unit within a lamp housing, and a drive unit connected to the shielding part to rotate the shielding part.

9 Claims, 10 Drawing Sheets

HEADLAMP APPARATUS FOR VEHICLE

CROSS-REFERENCE TO RELATED APPLICATION

This application claims the benefit under 35 U.S.C. §119 of Korean Patent Application No. 10-2011-0049765, filed on May 25, 2011, which is hereby incorporated by reference in its entirety.

BACKGROUND

1. Technical Field

The present disclosure relates to a headlamp apparatus for vehicles and, more particularly, to a headlamp apparatus for a vehicle which can secure a sufficient field of vision for a driver while inhibiting dazzling of another vehicle's driver due to light from the headlamp apparatus.

2. Description of the Related Art

Generally, a vehicle is provided with a lamp device which has a lighting function to provide a clear field of vision to a driver of the vehicle in a driving direction at night while informing other drivers or pedestrians of a driving state of the vehicle.

A conventional lamp for vehicles includes a light source, such as a halogen lamp or a high intensity discharge lamp (HID lamp), and a reflective plate which reflects light emitted from the light source in a forward direction.

In addition, the lamp is provided with a lens separate from the reflective plate and the light source. A reflective surface of the reflective plate and the lens are subjected to a process of patterning and coating to provide various functions such as reflection, emission and diffusion of light.

As a result, the conventional lamp has a complicated structure and a large number of components, and requires many manufacturing processes, causing an increase in manufacturing costs.

Recently, a light emitting diode (LED) has been adopted as a light source of a headlight or lamp device for vehicles. That is, an LED light source is adopted in an attempt to solve the problems of the complicated structure and many manufacturing processes of the conventional lamp for vehicles. Specifically, the lifetime of the lamp device can be extended using characteristics of the LED as a light source and space restriction of the lamp device can be overcome by the small size of the LED.

FIG. 1 is a side sectional view of a conventional headlamp apparatus for vehicles.

Referring to FIG. 1, a headlamp apparatus for vehicles 150 is located under an engine compartment and includes a lamp housing 120 open at a front side thereof. The lamp housing 120 receives a light source 131, a reflective plate 132, and an internal lens 133.

The light source 131 emits light by application of power thereto. The reflective plate 132 is placed behind the light source 131 and reflects light emitted from the light source 131 in a forward direction. The internal lens 133 is located in front of the light source 131 and refracts light to be directed to the outside.

The lamp housing 120 is also provided therein with a cooler which includes cooling fins 134 and a cooling fan 135 to cool the light source 131.

The open side of the lamp housing 120 is covered by an external lens 140. Thus, light from the light source 131 is directly emitted to the outside through the external lens 140 via the internal lens 133 or after being reflected by the reflective plate 132.

It should be noted that the above description is provided for understanding of the background art and is not a description of a well-known technique in the art.

Conventionally, when a headlamp apparatus for vehicles employs LEDs as a light source, the headlamp apparatus includes an upper headlight unit for upward lighting and a lower headlight unit for downward lighting which includes a shielding part to inhibit dazzling of drivers in the approaching lane. As the upper and lower headlight units are installed in a small space of the headlamp apparatus, there is a problem of an increase in the size of the headlamp apparatus and the number of assembly components.

As such, the lighting pattern of the conventional headlamp apparatus is divided into upward lighting and downward lighting. Thus, when the upward lighting is performed to secure driver visibility, drivers in front of the vehicle or approaching in the opposite lane are subjected to glare. On the contrary, when the downward lighting is performed in consideration of the other driver's security, it is difficult to secure driver visibility, thereby causing accidents.

Therefore, there is a need to solve such problems.

BRIEF SUMMARY

To improve upon the art and address one or more of the needs outlined above, the present disclosure provides a headlamp apparatus for a vehicle which may realize upward lighting and downward lighting using a single headlamp, thereby achieving size reduction of the headlamp apparatus.

Further, the present disclosure provides a headlamp apparatus for a vehicle which can secure a sufficient field of vision of a driver while inhibiting dazzling of another vehicle's driver due to light from the headlamp apparatus.

In accordance with one aspect of the present disclosure, a headlamp apparatus for a vehicle includes: a light emitting diode (LED) light source located at a first focal point and emitting light; a reflecting member surrounding the LED light source and reflecting light emitted from the LED light source; a lens unit disposed in front of the LED light source and allowing light to pass therethrough; a cooler disposed under the LED light source to cool the LED light source and having a leading end located behind a second focal point; a shielding part rotatably disposed at the second focal point between the LED light source and the lens unit within a lamp housing, the shielding part including a reflective plate reflecting light to enter the lens unit when the light is reflected by the reflecting member and travels towards the second focal point, the reflective plate having an indentation formed at a leading end thereof towards a rear side of the reflective plate; and a drive unit connected to the shielding part to rotate the shielding part.

The amount of light reflected by the reflective plate and entering the lens unit may be adjusted by a rotational angle of the reflective plate.

The apparatus may further include a sensor unit detecting a distance between the vehicle and an object in front of the vehicle; and a controller controlling the drive unit to adjust the rotational angle of the reflective plate based on a measured distance from the sensor unit.

The shielding part may include a support member connected to a lower surface of the reflective plate to support the reflective plate and being provided at a lower end of the support member with a connecting shaft connected to the drive unit. Here, the connecting shaft is connected to the drive unit and constitutes a rotational axis upon rotation of the support member by the drive unit.

The amount of light reflected by the reflective plate and entering the lens unit may increase with increasing rotational angle of the reflective plate.

When the reflective plate is not rotated, the light from the LED light source may realize downward lighting, and when the reflective plate is rotated to a preset maximum rotational angle, the light from the LED light source may realize upward lighting.

The drive unit may rotate the reflective plate by a rotational angle preset for each of a plurality of rotational stages divided up to a preset maximum rotational angle.

The drive unit may rotate the reflective plate according to a rotational angle preset for each of a plurality of rotational stages divided by a stepper motor.

The reflective plate may be integrally formed with the support member, and the reflective plate and the support member form an L-shaped side section.

BRIEF DESCRIPTION OF THE DRAWINGS

The above and other aspects, features and advantages of the present disclosure will become apparent from the following description of embodiments given in conjunction with the accompanying drawings, in which.

DETAILED DESCRIPTION

Figure 1:
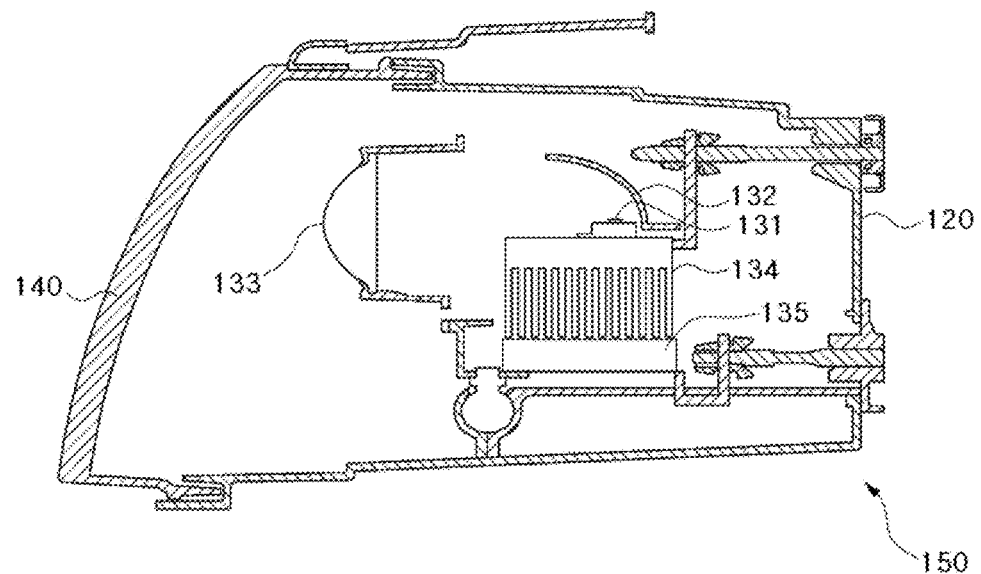
FIG. 1 is a sectional view of a conventional headlamp apparatus for vehicles.
Figure 2:
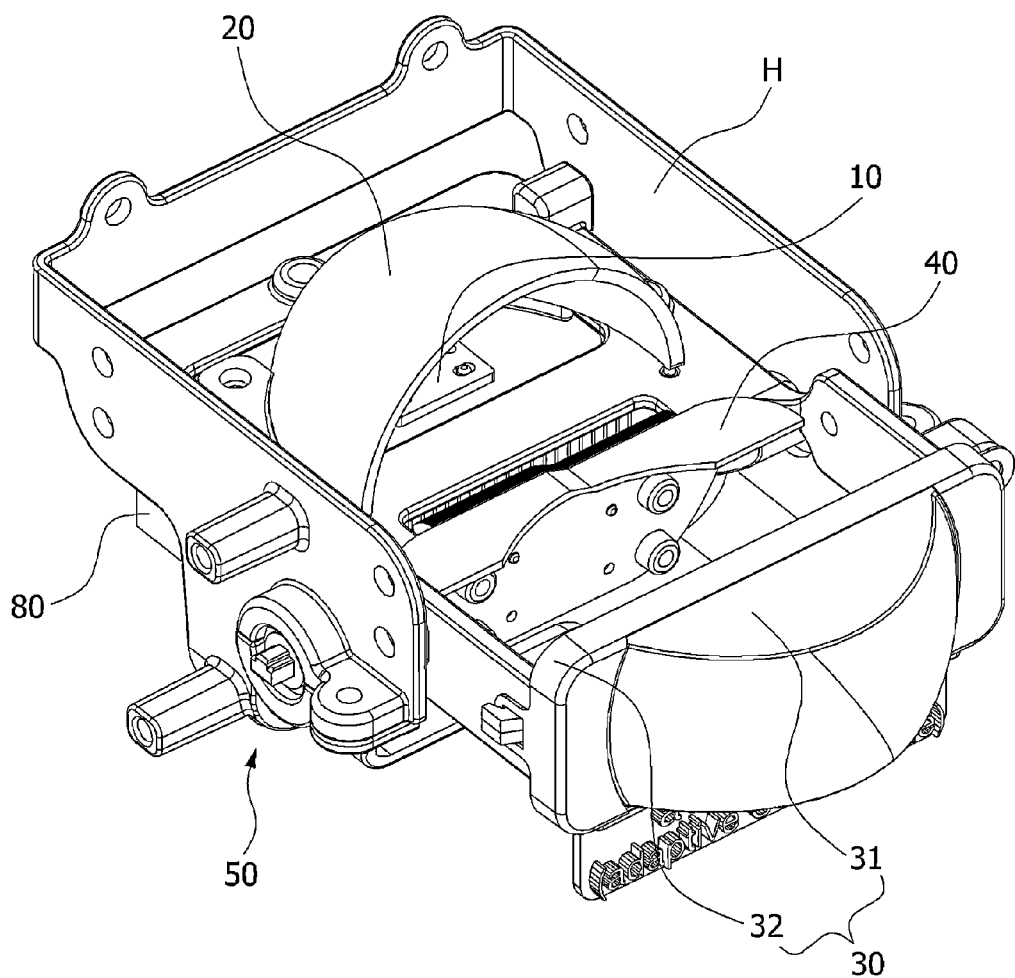
FIG. 2 is a perspective view of a headlamp apparatus for vehicles in accordance with an exemplary embodiment of the present disclosure.
Figure 3:
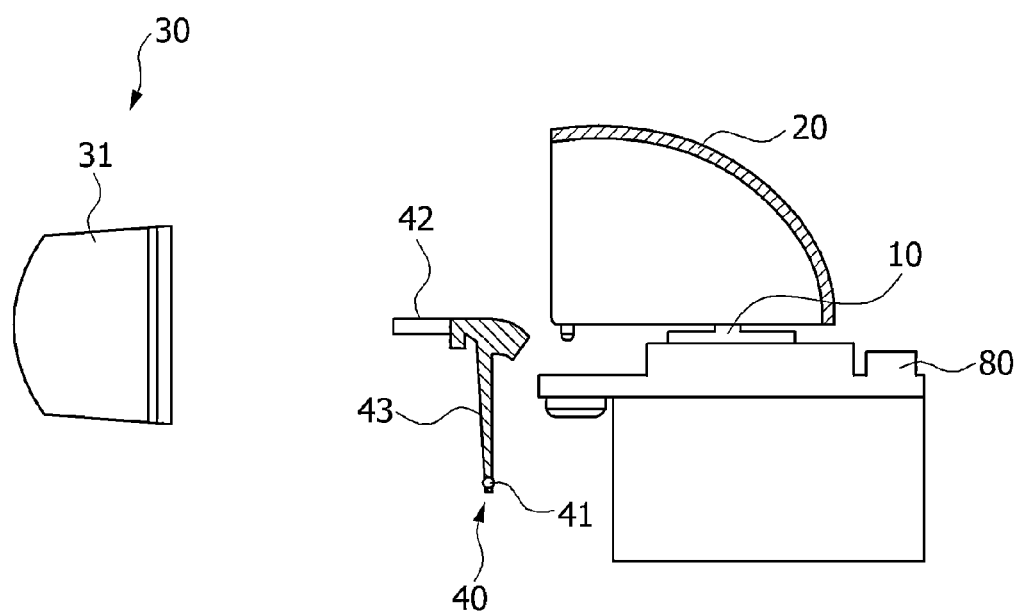
FIG. 3 is a view illustrating an operating state of the headlamp apparatus in accordance with the exemplary embodiment of the present disclosure, which realizes downward lighting.
Figure 4:
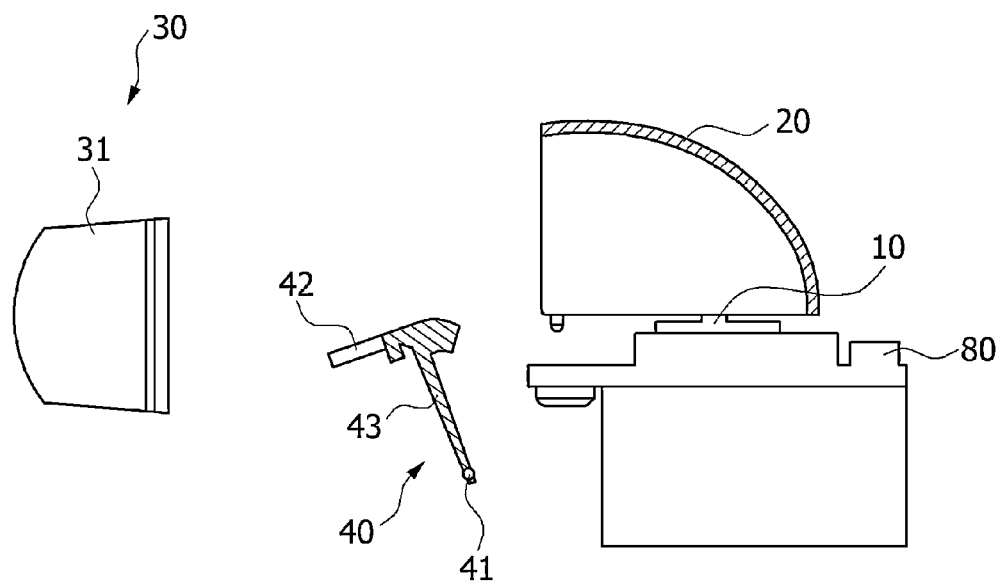
FIG. 4 is a view illustrating an operating state of the headlamp apparatus in accordance with the exemplary embodiment of the present disclosure, which realizes upward lighting.
Figure 5:
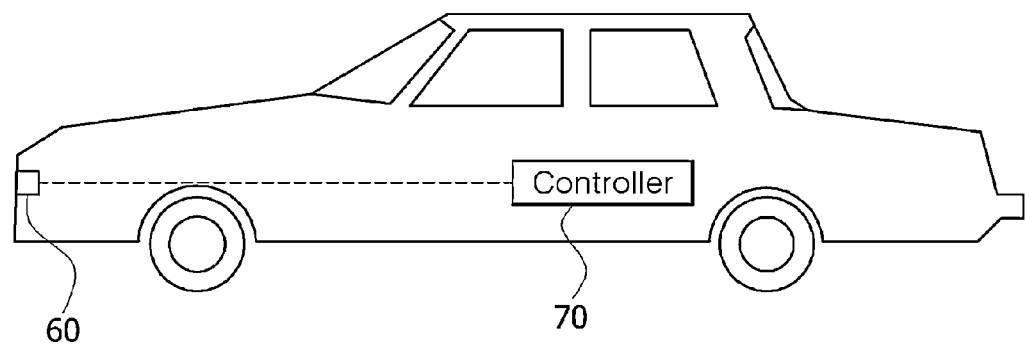
FIG. 5 shows a sensor unit and a controller of the headlamp apparatus in accordance with the exemplary embodiment of the present disclosure.

Embodiments of the present disclosure will now be described in detail with reference to the accompanying drawings. It should be noted that the drawings are not to precise scale and may be exaggerated in thickness of lines or size of components for descriptive convenience and clarity only.

Furthermore, terms used herein are defined by taking functions of the present disclosure into account and can be changed according to the custom or intention of users or operators. Therefore, definition of the terms should be made according to the overall disclosure set forth herein.

Referring to FIG. 2 to FIG. 5, and FIG. 16, a headlamp apparatus for vehicles in accordance with an exemplary embodiment includes a light emitting diode (LED) light source 10, a reflecting member 20, a lens unit 30, a shielding part 40, a drive unit 50, a sensor unit 60, a controller 70, and a cooler 80.

The LED light source 10 is received in a lamp housing H and emits light to the outside. The LED light source 10 is located on a first focal point f1 and the light emitted from the LED light source 10 passes through the lens unit 30 directly or after being reflected by the reflecting member 20.

In this embodiment, a light emitting diode having high luminous efficacy is used for the LED light source 10.

The reflecting member 20 is received in the lamp housing H to surround the LED light source 10. Thus, some of light emitted from LED light source 10 is reflected in a forward direction by the reflecting member 20 and is focused on a second focal point f2.

The reflecting member 20 may have an oblate surface, an ellipsoid-parabola composite surface, or a curved surface given a high degree of freedom through manipulation of the curved surface using these surfaces as a principal surface.

The lens unit 30 is located in front of the LED light source 10. The lens unit 30 allows light emitted from the LED light source 10 or light reflected by the reflecting member 20 to pass therethrough.

The lens unit 30 may include a lens holder 32 and a lens 31 received in the lens holder 32. In this embodiment, the lens 31 is an aspheric lens. Light passing through the lens unit 30 is distributed to the outside, thereby realizing upward or downward lighting.

The cooler 80 is disposed under the LED light source 10 to cool the LED light source 10. The cooler 80 contacts the LED light source 10 to disperse heat from the LED light source 10, thereby suppressing temperature increase of the LED light source 10.

The cooler 80 has a leading end located behind the second focal point f2. Thus, light is not affected by the cooler 80 when passing through the second focal point f2. The shielding part 40 is disposed in front of the cooler 80. The shielding part 40 and the cooler 80 may be provided as separate components. In this case, it is possible to reduce the size of the cooler 80 as compared with a conventional cooler which also serves as the shielding part, thereby reducing manufacturing costs.

The shielding part 40 is disposed between the LED light source 10 and the lens unit 30. The shielding part 40 is rotatably disposed inside the lamp housing H and is located at the second focal point f2.

The shielding part 40 includes a reflective plate 42 and a supporting member 43. The reflective plate 42 is located at the second focal point f2 and reflects light, which is reflected by the reflecting member 20 and travels towards the second focal point f2. The supporting member 43 is connected to a lower surface of the reflective plate 42 to support the reflective plate 42. The supporting member 43 is provided at a lower end thereof with a connecting shaft 41 connected to the drive unit 50. Thus, when the connecting shaft 41 is rotated by the drive unit 50, the reflective plate 42 is also rotated in the same direction as that of the connecting shaft 41. At this time, the connecting shaft 41 becomes a rotational axis of the reflective plate 42.

Figure 9:
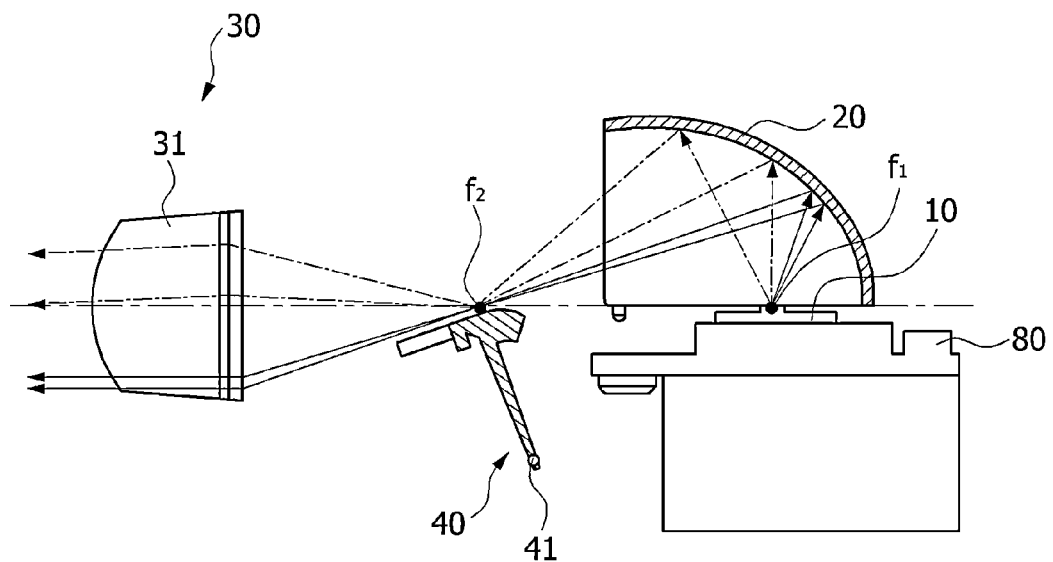
FIG. 9 is a view of an optical path when upward lighting is realized by the headlamp apparatus in accordance with the exemplary embodiment of the present disclosure.

The amount of light reflected by the reflective plate 42 and entering the lens unit 30 is adjusted by the rotational angle of the shielding part 40. That is, the shielding part 40 may be rotated from a position for realizing downward lighting (FIG. 6) to a position for realizing upward lighting (FIG. 9). Here, the amount of light reflected by the reflective plate 42 and entering the lens unit 30 increases with increasing rotational angle.

The reflective plate 42 is coated with a material such as aluminum or silver powder, which has a high coefficient of reflection. With this configuration, the reflective plate 42 may enhance reflection efficiency.

The reflective plate 42 has an indentation 44 formed at a leading end thereof towards a rear side of the reflective plate 42. In a top view of the reflective plate 42, the indentation 44 has a ")" shape. The leading end of the reflective plate 42 forms a cut-off line. Thus, the indentation 44 formed at the leading end of the reflective plate 42 further enlarges left and right sides of the cut-off line upwards. With this configuration, the headlamp apparatus may allow a driver to more easily recognize traffic signboards or other objects on the road.

The reflective plate 42 includes a first flat plate 42a, a second flat plate 42c, and an inclined plate 42b. The second flat plate 42c is located at a lower side than the first flat plate 42a. The first flat plate 42a and the second flat plate 42c are integrally connected by the inclined plate 42b.

The shielding part 40 has an "L"-shaped cross section. With this configuration, the size of the supporting member 43 can be minimized except for the reflective plate 42, thereby reducing the volume of the shielding part 40. As a result, it is possible to achieve a reduction in manufacturing costs and a size reduction of final products.

Figure 6:
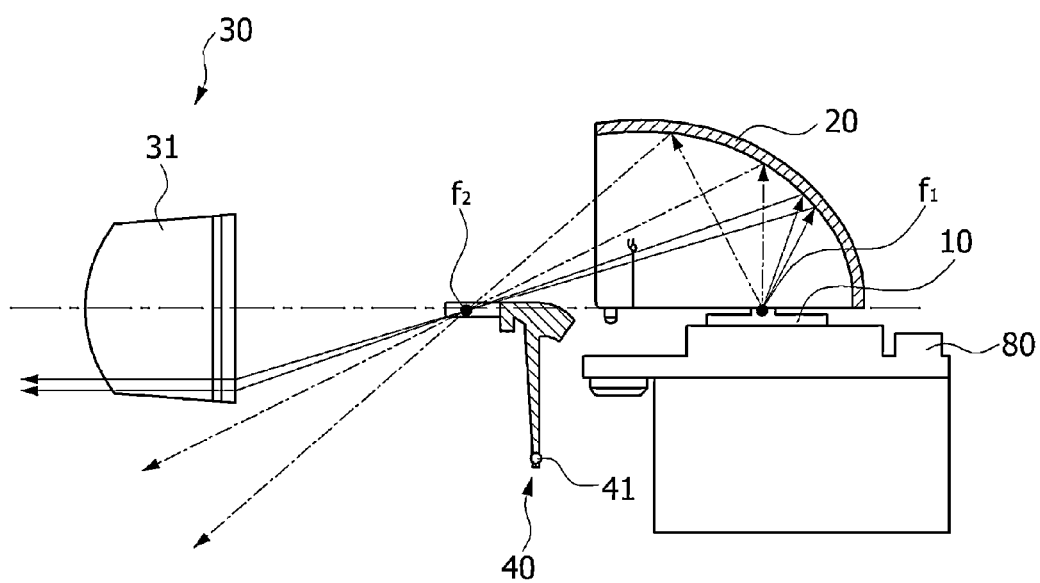
FIG. 6 is a view of an optical path when downward lighting is realized by the headlamp apparatus in accordance with the exemplary embodiment of the present disclosure.

Within the lens housing H, the drive unit 50 is connected to the shielding part 40 and generates power for rotating the shielding part 40. The drive unit 50 is connected to the connecting shaft 41 and rotates the connecting shaft 41, thereby rotating the entirety of the shielding part 40, which includes the supporting member 43 and the reflective plate 42. When the shielding part 40 is not rotated, the headlamp apparatus realizes downward lighting (FIG. 6). When the shielding part 40 is rotated to a predetermined maximum rotational angle, the headlamp apparatus realizes upward lighting (FIG. 9).

Although the maximum rotational angle of the shielding part 40 is set to 21 degrees in this embodiment, it should be appreciated that the maximum rotational angle of the shielding part 40 can be set to any angle so long as the headlamp apparatus for vehicles can realize upward lighting through rotation of the shielding part 40.

Figure 12:
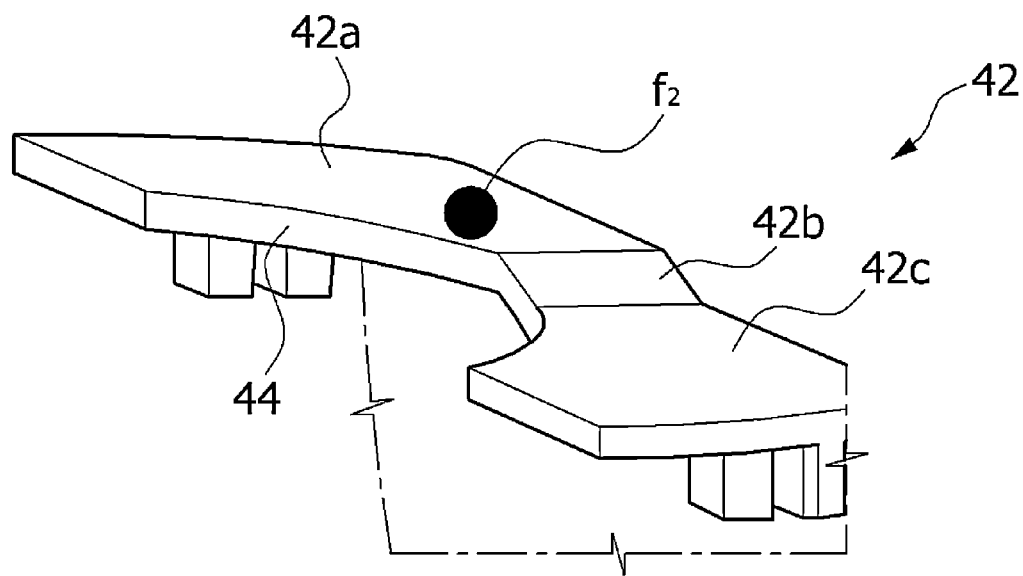
FIG. 12 shows a relationship between a reflective plate and a second focal point when downward lighting is realized by the headlamp apparatus in accordance with the exemplary embodiment of the present disclosure.
Figure 13:
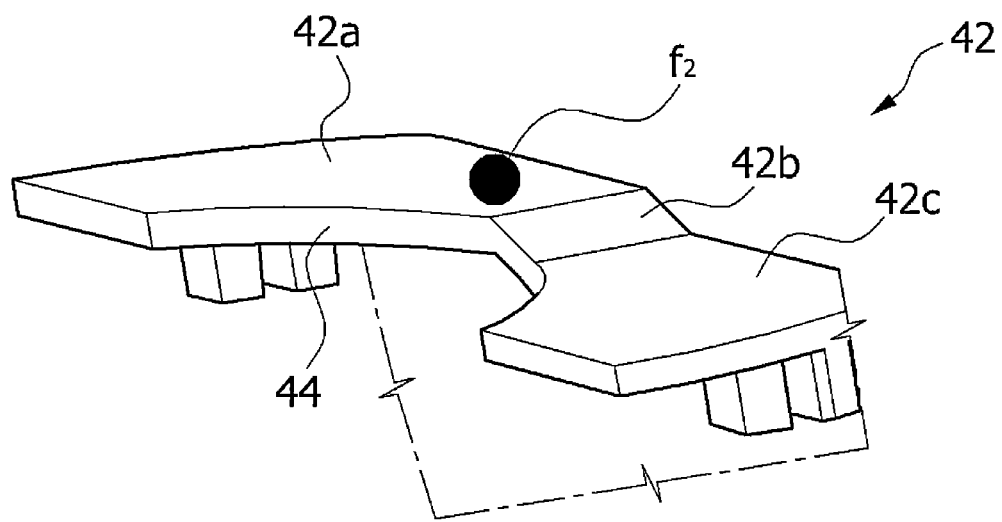
FIG. 13 shows a relationship between the reflective plate and the second focal point upon rotation of the reflective plate in the headlamp apparatus in accordance with the exemplary embodiment of the present disclosure.
Figure 14:
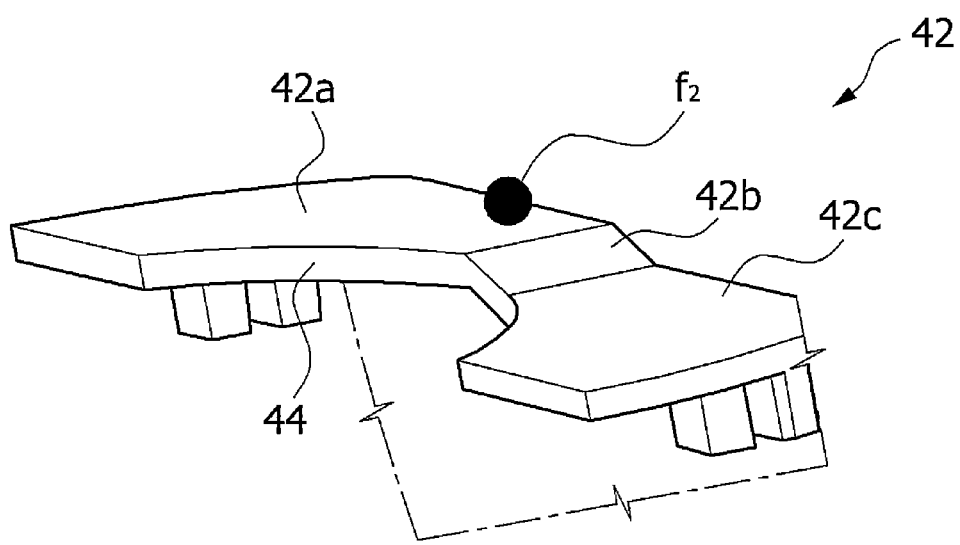
FIG. 14 shows a relationship between the reflective plate and the second focal point when the reflective plate is further rotated than the reflective plate shown in FIG. 13.
Figure 15:
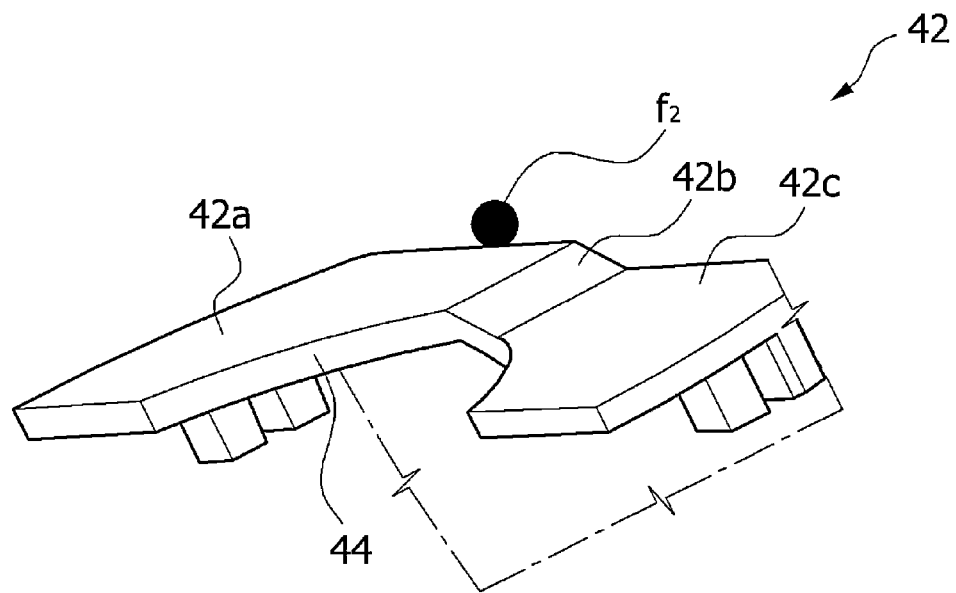
FIG. 15 shows a relationship between the reflective plate and the second focal point when upward lighting is realized by the headlamp apparatus in accordance with the exemplary embodiment of the present disclosure.
Figure 16:
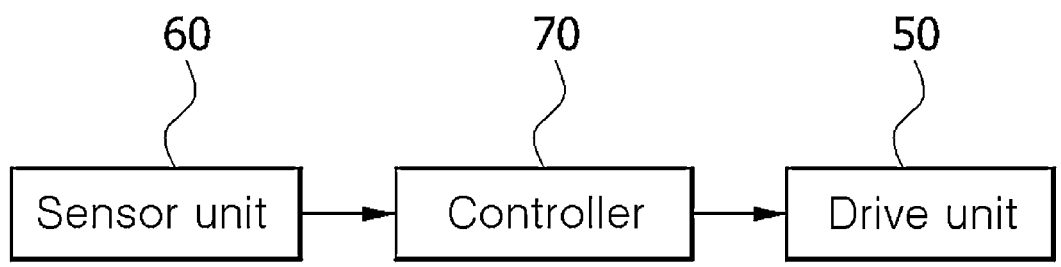
FIG. 16 is a block diagram of a control flow of the headlamp apparatus in accordance with the exemplary embodiment of the present disclosure.

The drive unit 50 rotates the supporting member 43 by a rotational angle preset for each of a plurality of rotational stages divided up to the preset maximum rotational angle. Specifically, the drive unit 50 may rotate the reflective plate 42 of FIG. 12 according to the rotational stages divided as shown in FIG. 13 to FIG. 15. When the reflective plate 42 is positioned as shown in FIG. 12, the headlamp apparatus realizes downward lighting, and when the reflective plate 42 is positioned as shown in FIG. 15, the headlamp apparatus realizes upward lighting. When the reflective plate 42 is positioned as shown in FIGS. 13 and 14, the headlamp apparatus realizes a beam pattern between the upward lighting and the downward lighting.

Although the rotational stage is illustrated as being divided into two stages between upward lighting and downward lighting in this embodiment, as shown in FIGS. 13 and 14, it should be understood that the rotational stage may be divided into three or more stages.

The drive unit 50 may include a stepper motor. When the drive unit includes the stepper motor, the drive unit 50 may freely adjust the rotational angle of the shielding part 40 in a unit of 1 to 5 degrees. As a result, the drive unit 50 may rotate the supporting member 43 by a rotational angle preset for each of a plurality of rotational stages divided by the stepper motor.

The sensor unit 60 detects an object in front of the driver's vehicle. According to this embodiment, the sensor unit 60 may be a camera for detecting an object.

Specifically, the sensor unit 60 determines the presence of light based on an image of an object photographed by the camera. When light is detected, the sensor unit 60 determines whether the light is emitted from a headlamp of another vehicle or other objects such as streetlamps. If it is determined that the light is emitted from the lamp of the other vehicle, the sensor unit 60 measures the distance from the driver's vehicle to the other vehicle or object. Here, the sensor unit 60 may determine whether the lamp is a headlamp of a vehicle approaching in the opposite lane or a rear lamp of a vehicle in front of the driver's vehicle.

After detecting an object in front of the driver's vehicle, the sensor unit 60 transmits the measured distance between the driver's vehicle and the object to the controller 70. The controller 70 controls operation of the drive unit 50 based on the measured distance transmitted from the sensor unit 60. That is, the controller 70 controls the rotational angle of the shielding part 40 through the drive unit 50 according to the distance between the driver's vehicle and the object.

The controller 70 rotates the shielding part 40 by dividing the rotational stage into a position for downward lighting (see FIGS. 6 and 12), an intermediate position between downward lighting and upward lighting (see FIGS. 13 and 14), and a position for upward lighting (see FIGS. 9 and 15) according to the distance between the driver's vehicle and the object. Here, as the distance between the driver's vehicle and the object increases, the shielding part 40 is rotated from the position for downward lighting towards the position for upward lighting.

In one exemplary embodiment, the headlamp apparatus for vehicles may include a resilient member (not shown) which provides resilient force to return the shielding part 40 at the position for upward lighting to the position for downward lighting. The resilient member inhibits backlash which can occur upon operation of the stepper motor.

Next, variation of a light distribution pattern and a pattern of light on a road according to the rotational stages of the shielding part 40 will be described with reference to FIGS. 6 to 15.

Some of the light emitted from the LED light source 10 is reflected by the reflecting member 20 to travel in the forward direction. When the shielding part 40 is located at the position for downward lighting (see FIGS. 6 and 12), some of the light (indicated by a solid line) traveling towards the second focal point f2 enters the lens 31 and is distributed to the outside, and the remaining light (indicated by a dotted line) is lost instead of entering the lens 31. As a result, the headlamp apparatus realizes downward lighting. The light distribution pattern in this condition is shown in FIG. 7, and the light pattern on the road is shown in FIG. 8.

When the shielding part 40 is located at the position for upward lighting (see FIGS. 9 and 15), some of the light (indicated by a solid line) traveling towards the second focal point f2 enters the lens 31, and the remaining light (indicated by a dotted line) is reflected by the reflective plate 42 and enters the lens 31. As such, when the shielding part 40 is located at the position for upward lighting, the light (indicated by the dotted line) is reflected by the reflective plate 42 and enters the lens 31 instead of being lost, unlike the case where the shielding part 40 is located at the position for downward lighting.

In other words, as the light is allowed to enter the lens 31 instead of being lost by positioning the shielding part 40 at the position for upward lighting, the headlamp apparatus for vehicles may realize upward lighting. As such, the shielding plate is provided with the reflective plate 42, so that light is allowed to enter the light instead of being lost, thereby improving lighting efficiency. As the amount of light passing through the lens 31 increases, it is possible to reduce the height of the lens 31. In addition, the reduction in height of the lens 31 makes it possible to mount a plurality of modules in the headlamp apparatus. Further, it is possible to provide various designs of headlamp apparatuses and cost reduction. The light distribution pattern in this condition is shown in FIG. 10, and the light pattern on the road is shown in FIG. 11.

Figure 7:
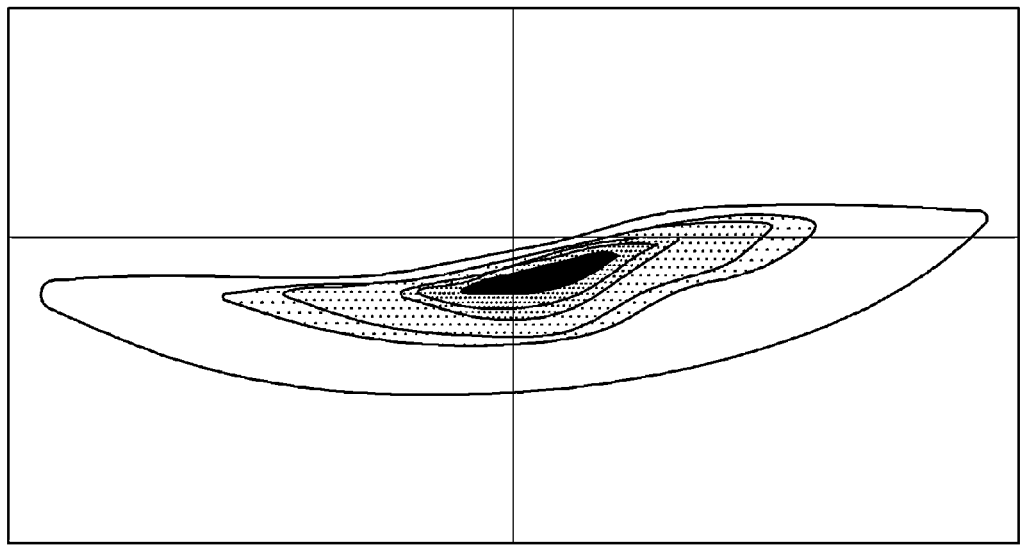
FIG. 7 is a view of a light distribution pattern when downward lighting is realized by the headlamp apparatus in accordance with the exemplary embodiment of the present disclosure.
Figure 8:
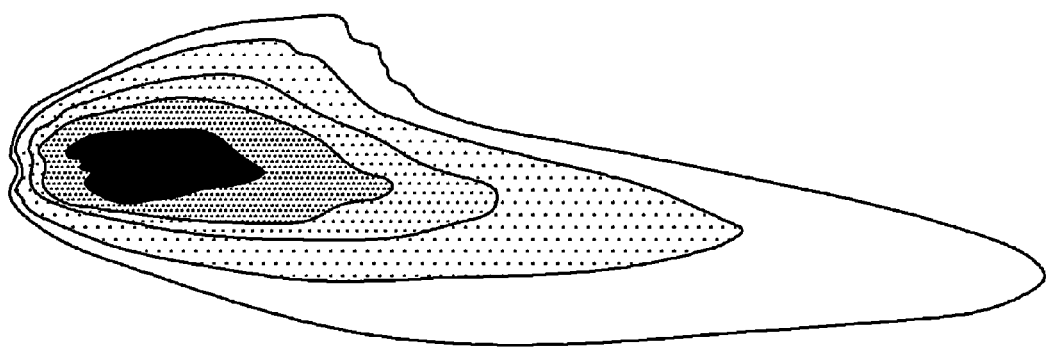
FIG. 8 is a view of a pattern of light on a road when downward lighting is realized by the headlamp apparatus in accordance with the exemplary embodiment of the present disclosure.

The light distribution pattern upon upward lighting (see FIG. 10) has a much narrower width and a much greater height than the light distribution pattern upon downward lighting (see FIG. 7). Further, the light pattern upon upward lighting (see FIG. 11) has a bilaterally symmetrical elliptical shape unlike the light pattern upon downward lighting (see FIG. 8).

On the other hand, even when the shielding part 40 is located between the position for downward lighting and the position for upward lighting (see FIGS. 13 and 14), some of the light is reflected by the reflective plate 42 and enters the lens 31 instead of being lost, unlike the case where the shielding part 40 is located at the position for downward lighting. At this time, the amount of light reflected by the reflective plate 42 and entering the lens 31 is smaller than the amount of light upon upward lighting. Of course, the amount of light reflected by the reflective plate 42 and entering the lens 31 is larger than the amount of light upon downward lighting.

Figure 10:
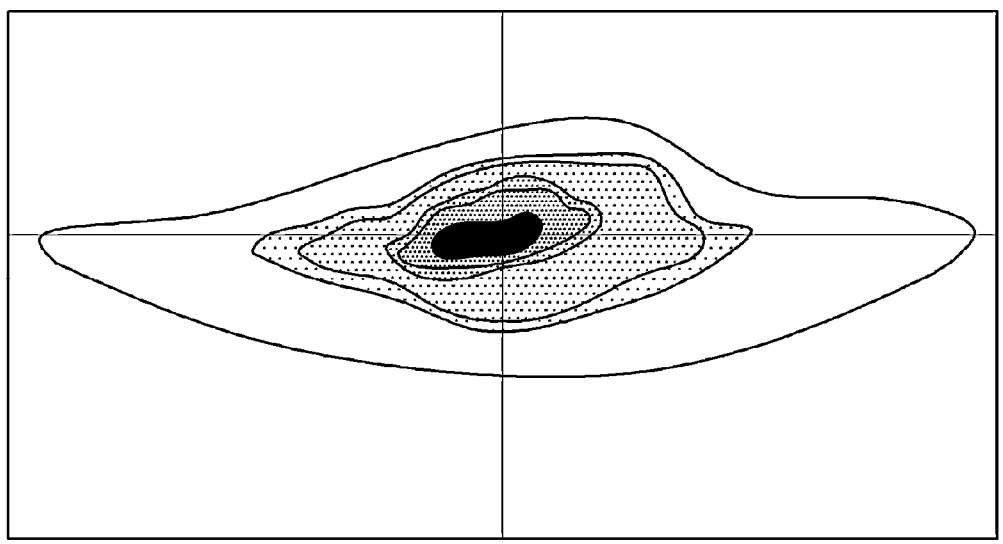
FIG. 10 is a view of a light distribution pattern when upward lighting is realized by the headlamp apparatus in accordance with the exemplary embodiment of the present disclosure.
Figure 11:
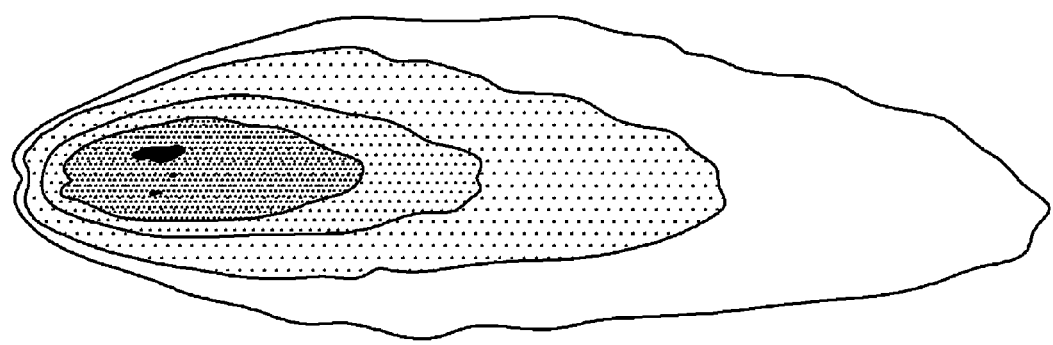
FIG. 11 is a view of a pattern of light on a road when upward lighting is realized by the headlamp apparatus in accordance with the exemplary embodiment of the present disclosure.

When the shielding part 40 is located as shown in FIGS. 13 and 14, the light distribution pattern has a narrower width and a greater height than the light distribution pattern upon downward lighting (see FIG. 7), but has a greater width and a smaller height than the light distribution pattern upon upward lighting (see FIG. 10). Further, when the shielding part 40 is located as shown in FIGS. 13 and 14, the pattern of light is gradually changed from the pattern of light upon downward lighting (see FIG. 8) to the pattern of light upon upward lighting (see FIG. 11).

Next, an operational principle of the headlamp apparatus in accordance with the exemplary embodiment will be described with reference to FIGS. 6 to 15.

In order to secure a sufficient field of vision for a driver in a vehicle during driving at night, the headlamp apparatus must realize upward lighting. The upward lighting may be achieved by operating the shielding part 40 as shown in FIG. 9. When the upward lighting is realized, the light distribution pattern and the pattern of light on the road are shown in FIGS. 10 and 11.

Upon upward lighting of the headlamp apparatus, there can be a problem in that another driver in an object, that is, a vehicle in front of the vehicle or approaching in the opposite lane, can suffer from glaze by light from the headlamp apparatus of the driver's vehicle. Thus, the headlamp apparatus detects the presence of an object and measures a distance between the vehicle and the object, if any, through the sensor unit 60.

In order to secure a sufficient field of vision for the driver of the vehicle without causing dazzling of the other driver, the rotational angle of the shielding plate 40 is adjusted based on the measured distance between the vehicle and the object.

According to this embodiment, if the distance between the vehicle and an object is greater than or equal to a first preset value, the shielding part 40 is located at the position for upward lighting (see FIG. 9). Namely, if the measured distance is greater than or equal to the first preset value, the headlamp apparatus realizes upward lighting in order to secure a sufficient field of vision for the driver of the vehicle, since the upward lighting realized by the headlamp apparatus does not cause dazzling of other drivers. Here, the first preset value means a distance in which upward lighting realized by the headlamp apparatus does not cause dazzling of other drivers, and may be obtained through experimentations in practice. In this embodiment, the first preset value is set to 135 m.

If the distance between the vehicle and an object is less than the first preset value but is greater than a second preset value, the shielding part 40 is rotated from the position for upward lighting (see FIG. 9) towards the position for downward lighting (see FIG. 6). Here, rotation of the shielding part 40 is performed stepwise, as shown in detail in FIGS. 12 to 15.

For example, if the distance between the vehicle and an object is about 110 m, the reflective plate 42 is located as shown in FIG. 14 to secure a field of vision of the driver of the vehicle up to a distance approaching 110 m without dazzling of other drivers.

If the distance between the vehicle and an object is about 85 m, the reflective plate 42 is further rotated to the position for downward lighting (see FIG. 6). As a result, it is possible to secure a field of vision of the driver of the vehicle up to a distance approaching 85 m without dazzling of other drivers.

If the distance between the vehicle and an object is less than or equal to the second preset value, the shielding part 40 is located at the position for downward lighting (see FIG. 6). That is, if the measured distance is less than or equal to the second preset value, the headlamp apparatus can cause severe dazzling of other drivers in other lighting conditions except for downward lighting. Thus, in this case, the headlamp apparatus realize downward lighting in order to minimize dazzling of the other drivers. As in the first preset value, the second preset value may be obtained through experimentation. In this embodiment, the second preset value is set to 60 m.

On the other hand, if the distance between the vehicle and an object gradually increases, the shielding part 40 is rotated stepwise from the position for downward lighting towards the position for upward lighting. As a result, it is possible to secure a sufficient field of vision of the driver in the vehicle.

As such, according to the exemplary embodiment, the headlamp apparatus may realize upward lighting and downward lighting using a single headlamp at the same time, thereby achieving a reduction in size and weight of the headlamp apparatus while reducing manufacturing costs through a decrease in the number of components.

In addition, the headlamp apparatus according to the embodiments may emit light in various manners including upward lighting and downward lighting, thereby making it possible to secure a sufficient vision of a driver while inhibiting dazzling of other drivers.

Further, since the headlamp apparatus according to the embodiments may increase use frequency of upward lighting, the apparatus may secure a sufficient field of vision for a driver at night, thereby enhancing stability.

Further, the headlamp apparatus according to the embodiments may reduce the height of a lens therein, thereby reducing manufacturing costs.

Although some embodiments have been described in the present disclosure, it should be understood by those skilled in the art that these embodiments are given by way of illustration only, and that various modifications, variations, and alterations can be made without departing from the spirit and scope of the present disclosure. The scope of the present disclosure should be limited only by the accompanying claims and equivalents thereof.

What is claimed is:

1. A headlamp apparatus for a vehicle comprising:
   a light emitting diode (LED) light source located at a first focal point and emitting light;
   a reflecting member surrounding the LED light source and reflecting light emitted from the LED light source;
   a lens unit disposed in front of the LED light source and allowing light to pass therethrough;
   a cooler disposed under the LED light source to cool the LED light source and having a leading end located behind a second focal point;
   a shielding part rotatably disposed at the second focal point between the LED light source and the lens unit within a lamp housing, the shielding part including a reflective plate reflecting light to enter the lens unit when the light is reflected by the reflecting member and travels towards the second focal point, the reflective plate having an indentation formed at a leading end thereof towards a rear side of the reflective plate; and
   a drive unit connected to the shielding part to rotate the shielding part.

2. The headlamp apparatus of claim 1, wherein an amount of light reflected by the reflective plate and entering the lens unit is adjusted by a rotational angle of the reflective plate.

3. The headlamp apparatus of claim 2, further comprising:
   a sensor unit detecting a distance between the vehicle and an object in front of the vehicle; and
   a controller controlling the drive unit to adjust the rotational angle of the reflective plate based on a measured distance from the sensor unit.

4. The headlamp apparatus of claim 3, wherein the shielding part comprises a support member connected to a lower surface of the reflective plate to support the reflective plate and having a connecting shaft at a lower end of the support member, the connecting shaft being connected to the drive unit and constituting a rotational axis upon rotation of the support member by the drive unit.

5. The headlamp apparatus of claim 4, wherein an amount of light reflected by the reflective plate and entering the lens unit increases with increasing rotational angle of the reflective plate.

6. The headlamp apparatus of claim 5, wherein, when the reflective plate is not rotated, the light from the LED light source realizes downward lighting, and when the reflective plate is rotated to a preset maximum rotational angle, the light from the LED light source realizes upward lighting.

7. The headlamp apparatus of claim 6, wherein the drive unit rotates the reflective plate by a rotational angle preset for each of a plurality of rotational stages divided up to a preset maximum rotational angle.

8. The headlamp apparatus of claim 7, wherein the drive unit rotates the reflective plate according to a rotational angle preset for each of a plurality of rotational stages divided by a stepper motor.

9. The headlamp apparatus of claim 7, wherein the reflective plate is integrally formed with the support member, the reflective plate and the support member forming an L-shaped side section.

* * * * *